United States Patent
Matsuoka et al.

(10) Patent No.: US 10,870,161 B2
(45) Date of Patent: Dec. 22, 2020

(54) ARC WELDING CONTROL METHOD

(71) Applicant: Panasonic Intellectual Property Management Co., Ltd., Osaka (JP)

(72) Inventors: Noriyuki Matsuoka, Osaka (JP); Atsuhiro Kawamoto, Hyogo (JP); Junji Fujiwara, Osaka (JP); Kaito Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 15/514,846

(22) PCT Filed: Oct. 16, 2015

(86) PCT No.: PCT/JP2015/005226
§ 371 (c)(1),
(2) Date: Mar. 28, 2017

(87) PCT Pub. No.: WO2016/059805
PCT Pub. Date: Apr. 21, 2016

(65) Prior Publication Data
US 2017/0225253 A1 Aug. 10, 2017

(30) Foreign Application Priority Data
Oct. 17, 2014 (JP) .................. 2014-212468

(51) Int. Cl.
*B23K 9/09* (2006.01)
*B23K 9/095* (2006.01)
(Continued)

(52) U.S. Cl.
CPC ............... *B23K 9/09* (2013.01); *B23K 9/073* (2013.01); *B23K 9/095* (2013.01); *B23K 9/12* (2013.01); *B23K 9/173* (2013.01)

(58) Field of Classification Search
CPC .......... B23K 9/073; B23K 9/09; B23K 9/095; B23K 9/12; B23K 9/173; B23K 9/0671; B23K 9/0673; B23K 9/092; B23K 9/093
(Continued)

(56) References Cited

U.S. PATENT DOCUMENTS

2008/0314884 A1* 12/2008 Fujiwara ............ B23K 9/0735
219/130.51
2009/0152252 A1 6/2009 Kawamoto et al.
(Continued)

FOREIGN PATENT DOCUMENTS

| JP | 60-223662 | 11/1985 |
|---|---|---|
| JP | 60-255276 | 12/1985 |

(Continued)

OTHER PUBLICATIONS

International Search Report of PCT application No. PCT/JP2015/005226 dated Dec. 22, 2015.

*Primary Examiner* — Ibrahime A Abraham
*Assistant Examiner* — John J Norton
(74) *Attorney, Agent, or Firm* — Wenderoth, Lind & Ponack, L.L.P.

(57) ABSTRACT

In a consumable electrode-type arc welding in which pulse welding and short-circuit welding are alternately repeated, a welding current is controlled such that a welding current immediately before shifting from the pulse welding to the short-circuit welding is lower than a base current in a pulse.

8 Claims, 15 Drawing Sheets

(51) Int. Cl.
*B23K 9/12*     (2006.01)
*B23K 9/173*    (2006.01)
*B23K 9/073*    (2006.01)

(58) Field of Classification Search
USPC .............................................. 219/137, 137 R
See application file for complete search history.

(56) References Cited

U.S. PATENT DOCUMENTS

| | | |
|---|---|---|
| 2012/0074115 A1 | 3/2012 | Kazmaier et al. |
| 2012/0097654 A1* | 4/2012 | Kawamoto ............ B23K 9/073 |
| | | 219/125.1 |
| 2012/0199567 A1* | 8/2012 | Nakagawa ........... B23K 9/0671 |
| | | 219/137 R |

FOREIGN PATENT DOCUMENTS

| | | |
|---|---|---|
| JP | 9-150267 | 6/1997 |
| JP | 2006-334601 | 12/2006 |
| JP | 2011-088209 | 5/2011 |
| JP | 2011-516270 | 5/2011 |
| JP | 2011088209 A * | 5/2011 |
| JP | 2012-529991 | 11/2012 |
| JP | 2013-154381 | 8/2013 |
| JP | 2013-169555 | 9/2013 |
| WO | 2009/156845 | 12/2009 |

* cited by examiner

ARC WELDING CONTROL METHOD

This application is a U.S. national stage application of the PCT international application No. PCT/JP2015/005226 filed on Oct. 16, 2015, which claims the benefit of foreign priority of Japanese patent application No. 2014-212468 filed on Oct. 17, 2014, the contents all of which are incorporated herein by reference.

TECHNICAL FIELD

The present invention relates to a method of controlling consumable electrode-type arc welding in which pulse welding and short-circuit welding are alternately repeated.

BACKGROUND ART

Consumable electrode-type arc welding methods include pulse welding and short-circuit welding which are practically in use. However, the pulse welding and the short-circuit welding have disadvantages described below.

The pulse welding has smaller heat input than a spray-shift welding with a constant current exceeding the critical current. However, the pulse welding requires a long arc length in order to maintain a stable pulse shift welding, hence hardly reducing heat input. Therefore, in so-called position welding such as vertical welding and an overhead welding, a bead, such as a sagging bead, having a defective shape may be produced.

In the short-circuit welding, the arc length is short, and a welding defect, such as incomplete fusion, may occur for a short-circuit duration since heat input related to the arc is small. Sputter may be often produced due to the short arc length and short circuit.

In order to prevent the above-described disadvantages, an arc welding method in which short-circuit welding and pulse welding alternately repeated by a predetermined number of times is proposed (PTL 1). PTL 1 discloses that a welding defect, such as incomplete fusion or a bead, such as a sagging bead, having a defective shape in position welding can be prevented by controlling the heat input and controlling the shape of the bead.

CITATION LIST

Patent Literature

PTL 1: Japanese Patent Laid-Open Publication No. 60-255276

SUMMARY

In a consumable electrode-type arc welding in which pulse welding and short-circuit welding are alternately repeated, a welding current is controlled such that a welding current immediately before shifting from the pulse welding to the short-circuit welding is lower than a base current in a pulse.

DETAIL DESCRIPTION OF PREFERRED EMBODIMENTS

Exemplary Embodiment 1

Figure 1A:
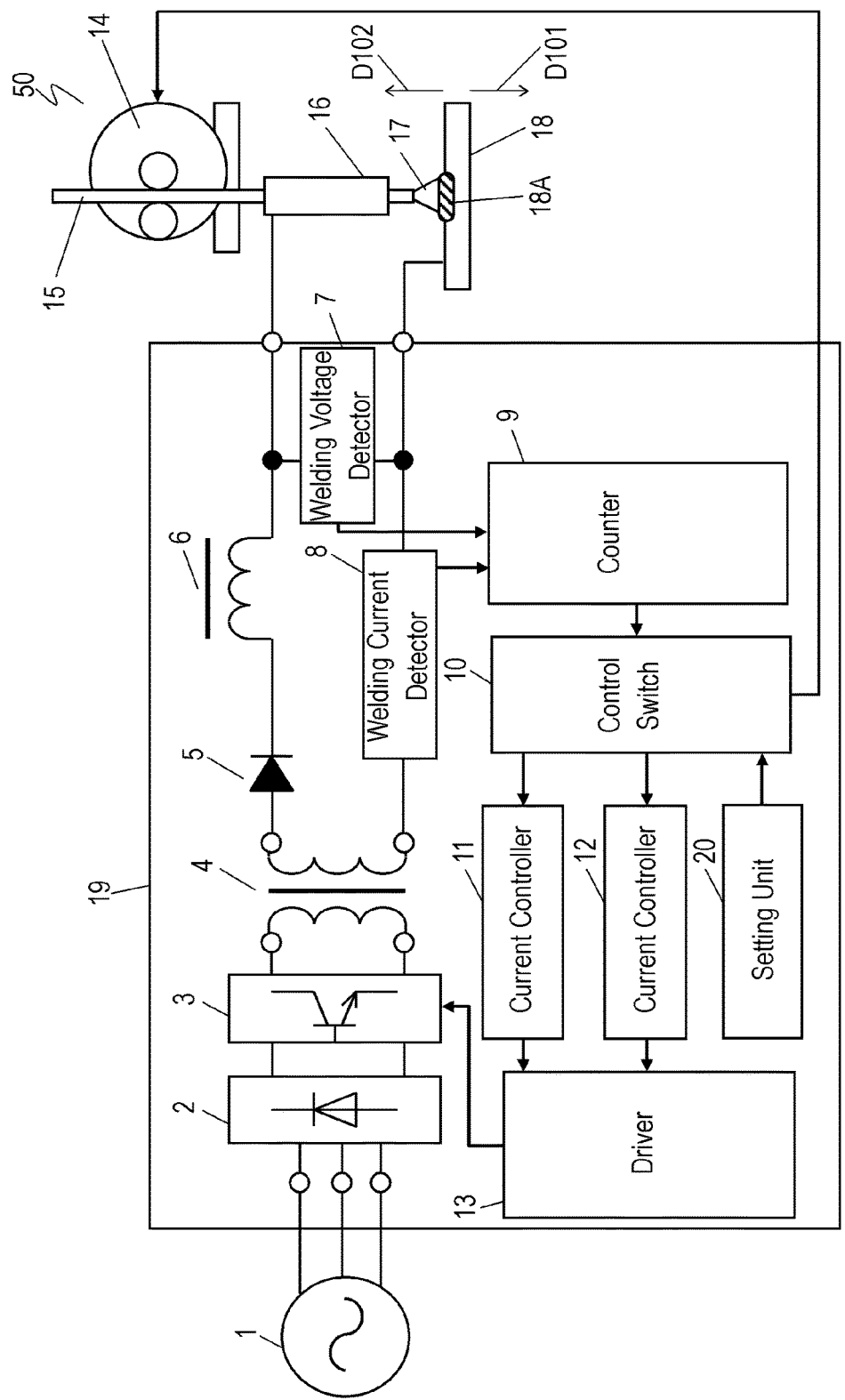
FIG. 1A is a schematic diagram of an arc welding apparatus in accordance with Exemplary Embodiment 1.

FIG. 1A is a schematic diagram of arc welding apparatus 50 in accordance with Exemplary Embodiment 1. Arc welding apparatus 50 mainly includes welding power supply 19 that supplies electric power to welding workpiece 18 and welding wire 15 which is a consumable welding electrode, welding torch 16, and wire feeder 14 that feeds welding wire 15. Wire feeder 14 feeds welding wire 15 in forward feeding direction D101 toward welding workpiece 18. Wire feeder 14 can send welding wire 15 also in backward feeding direction D102 opposite to forward feeding direction D101. For example, welding torch 16 is attached to a welding robot executing welding. Otherwise, for example, welding torch 16 is held by an operator, and the operator executes welding. In welding power supply 19, alternating-current (AC) power input from input power supply 1 is rectified by primary rectifier 2, is converted into an alternating current by switch 3, is stepped down by transformer 4, is rectified by secondary rectifier 5 and DCL (inductance) 6, and is applied between welding wire 15 and welding workpiece 18. Welding arc 17 is generated between welding wire 15 and welding workpiece 18 due to the electric power applied between welding wire 15 and welding workpiece 18, thus executing welding. Welding power supply 19 includes welding voltage detector 7 which detects a welding voltage, welding current detector 8 which detects a welding current, and counter 9 which counts an elapsing time of a pulse welding duration/a short-circuit welding duration or the number of output pulses. Arc welding apparatus 50 further includes control switch 10 which switches controlling of a welding-output based on the number counted by counter 9, setting adjuster 20 for setting welding conditions, current controller 12 which controls a current for the pulse welding duration, current controller 11 which controls a current for the short-circuit welding duration, and driver 13. Counter 9 detects a first contact between welding wire 15 and welding workpiece 18 when a torch switch provided in welding torch 16 is operated or an operation program of the welding robot is executed after receiving an instruction to start welding. Counter 9 counts the time or the number of output pulses. Setting adjuster 20 sets a setting welding current set to perform welding, a setting welding voltage set to perform welding, a feeding speed of welding wire 15, the type of shielding gas, the material of welding wire 15, the diameter of welding wire 15, the period of pulse welding and the number of output pulses, the period of short-circuit welding and the number of occurrences of short circuit, and the like. Each of the configuration units constituting welding power supply 19 may be independently formed or may be formed by combining multiple configuration units, as necessary.

Figure 1B:
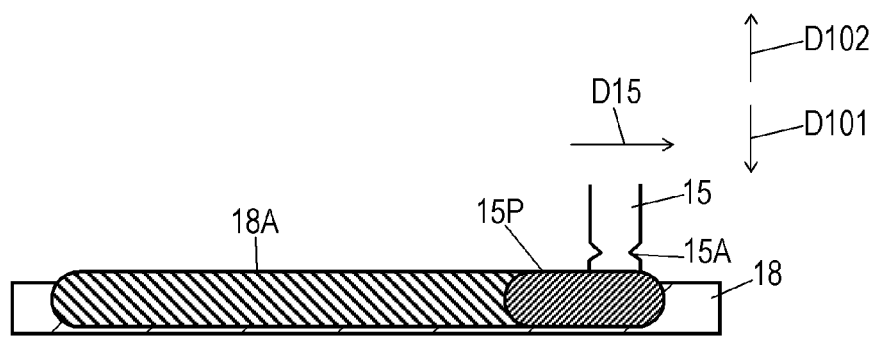
FIG. 1B is a schematic enlarged sectional view of a welding spot of arc welding in accordance with Embodiment 1.

An operation of arc welding apparatus 50 will be described below. FIG. 1B is a schematic enlarged sectional view of a welding spot of arc welding in accordance with Embodiment 1.

In arc welding apparatus 50, while an arc and a welding spot is shielded from outside air by supplying shielding gas through a gas supply port, a current is supplied from welding power supply 19 between welding wire 15 and welding workpiece 18. Accordingly, welding arc 17 is generated between welding wire 15 and welding workpiece 18, and the tip of welding wire 15 and a portion of welding workpiece 18 melt due to heat of welding arc 17. Molten welding wire 15 drops onto welding workpiece 18, thereby forming molten pool 15P together with the portion of welding workpiece 18 which melts due to heat of welding arc 17. While molten pool 15P is formed in accordance with a movement in welding direction D15 relative to welding workpiece 18 of welding torch 16, bead 18A is formed in accordance with a movement in welding direction D15 relative to welding workpiece 18, and welding workpiece 18 is welded.

Welding conditions of the welding are set through setting adjuster 20, include the feeding speed of welding wire 15 set previously through setting adjuster 20. Outputs of welding power supply 19 and a rotation of a motor are controlled to meet the setting conditions. Each of the above controllers control welding by controlling driver 13 to meet the setting conditions while monitoring the welding voltage and the welding current. The welding current which is a basic element of the controlling and is a current flowing in welding wire 15, and the waveform of the welding current are obtained through the output of welding current detector 8.

Figure 2:
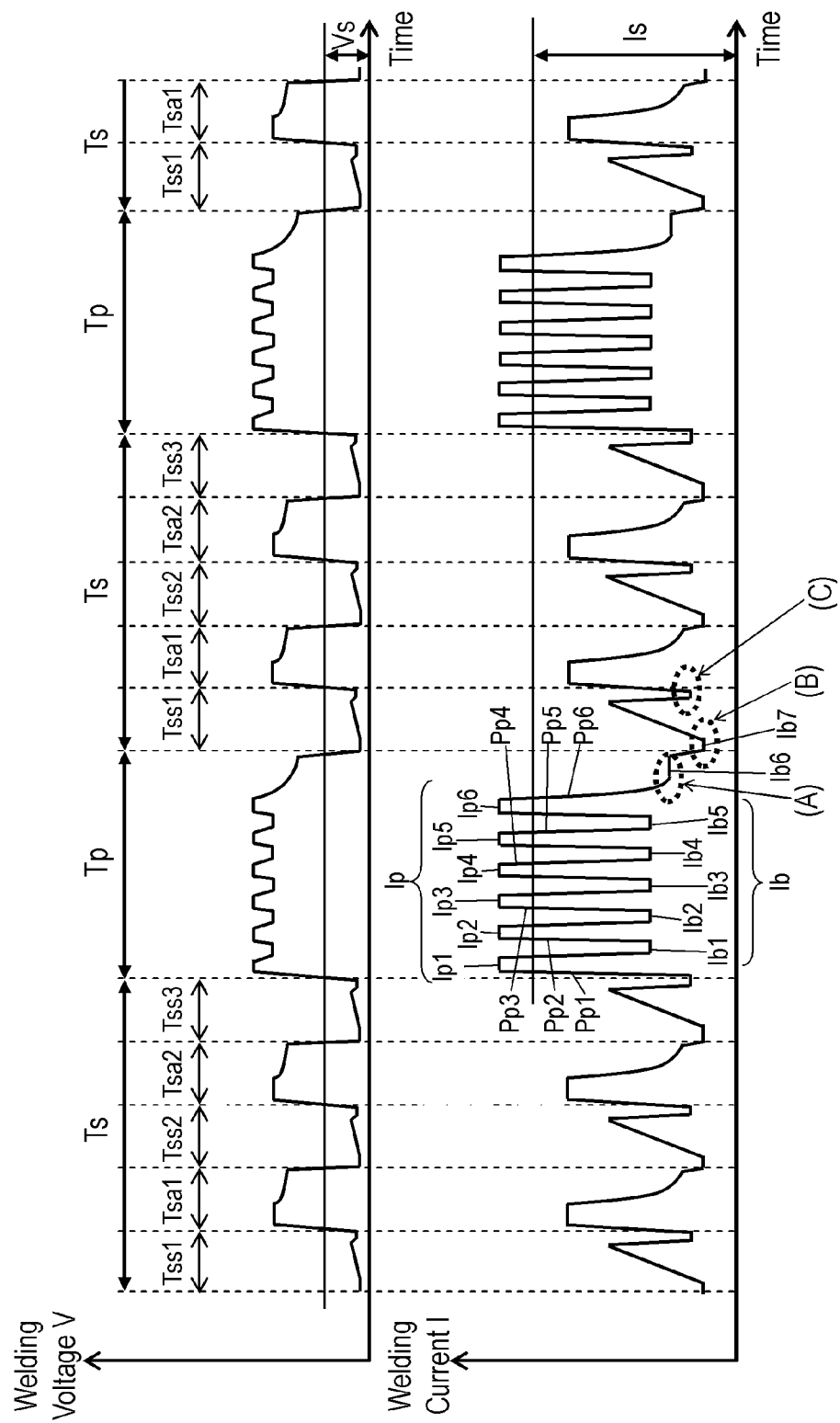
FIG. 2 illustrates a welding current and a welding voltage of arc welding in accordance with Embodiment 1.

FIG. 2 illustrates welding current I, and welding voltage V which is a voltage of welding wire 15. In FIG. 2, the vertical axes represent welding current I and welding voltage V, and the horizontal axes represent time. Short-circuit welding is performed for short-circuit welding duration Ts, and pulse welding is performed for pulse welding duration Tp.

Arc welding illustrated in FIG. 2 alternately and repetitively shifts between pulse welding duration Tp for pulse welding and short-circuit welding duration Ts for short-circuit welding. For pulse welding duration Tp, arc welding apparatus 50 is controlled such that welding current I flowing in welding wire 15, the welding electrode, forms plural pulses Pp1 to Pp6 having one or more values Ip1 to Ip6 of peak current Ip and one or more values Ib1 to Ib5 of base current Ib alternately repetitively. Values Ib1 to Ib5 of base current Ib may be identical to each other or may be different from each other.

Short-circuit welding duration Ts includes one or more short-circuit durations Tss1 to Tss3 for each of which short circuit between welding wire 15 and welding workpiece 18 is produced and further includes one or more arc-generating durations Tsa1 and Tsa2 for each of which an arc generated between welding wire 15 and welding workpiece 18 is controlled such that arc welding alternately shifts between one or more short-circuit durations Tss1 to Tss3 and one or more arc-generating durations Tsa1 and Tsa2.

Pulses Pp1 to Pp6 for pulse welding duration Tp detected based on the waveform of the welding current detected by welding current detector 8. For example, pulses Pp1 to Pp6 for pulse welding duration Tp can be detected based on a change pf welding current I (instantaneous current) from a value larger than predetermined threshold Is to a value smaller than the threshold. Therefore, pulses Pp1 to Pp6 for pulse welding duration Tp can be detected by comparing the welding current with threshold Is. Pulses Pp1 to Pp6 may be detected any method as long as each of pulses Pp1 to Pp6 can be detected.

For example, a short circuit between welding wire 15 and welding workpiece 18 for short-circuit welding duration Ts can be detected based on a change of welding voltage V (instantaneous voltage), detected by welding voltage detector 7, from a value higher than predetermined threshold Vs to a value lower than threshold Vs. In order to prevent a slight short circuit from being determined as short circuits for short-circuit durations Tss1 to Tss3, a case where welding voltage V is continuously lower than predetermined threshold Vs from the time welding voltage V changes from a value higher greater than threshold Vs to a value lower than threshold Vs until a predetermined time elapses may be determined to be a short circuit for each of short-circuit durations Tss1 to Tss3. A method of detecting the short circuit may be any method as long as each case of short circuit can be detected. Values of welding voltage V allowing the short-circuit welding to be stably performed at values of a wire feeding speed set by setting adjuster 20 for short-circuit welding duration Ts may be predetermined by setting adjuster 20. The number of short-circuit durations Tss1 to Tss3 may be set previously through setting adjuster 20. For pulse welding duration Tp, in combination with pulse conditions of setting adjuster 20, the wire feeding speed is set previously through setting adjuster 20 such that the average of welding current I for pulse welding duration Tp does not exceed the critical current in a spray transfer. The number of pulses Pp1 to Pp6 is also set previously through setting adjuster 20. Therefore, for example, in welding power supply 19 of arc welding apparatus 50, after a pulse welding is performed by generating pulses Pp1 to Pp6 by the number set through setting adjuster 20, current controller 12 for pulse welding and current controller 11 for short-circuit welding issue control outputs such that short circuit occurs for short-circuit durations Tss1 to Tss3 by the number of times set through setting adjuster 20, thereby performing short-circuit welding. Upon receiving the outputs from the controllers such as current controller 11 for short-circuit welding and current controller 12 for pulse welding, driver 13 supplies the control outputs to switch 3 such that a waveform of welding current I corresponding to each of the control outputs can be obtained. Accordingly, for example, welding power supply 19 outputs the welding current illustrated in FIG. 2 and causes the output welding current to flow in welding wire 15 and welding workpiece 18. Control switch 10 supplies a control output to wire feeder 14 to provide a wire feeding speed corresponding to the pulse welding or the short-circuit welding. Wire feeder 14 drives the motor to rotate at the wire feeding speed corresponding to the control output from control switch 10. Accordingly, welding wire 15 is fed at an optimal speed. Welding is thus performed while the pulse welding and the short-circuit welding are repetitively performed alternately under the setting conditions and welding wire 15 is fed at an optimal wire feeding speed for the pulse welding and the short-circuit welding.

The waveform of welding current I in accordance with the embodiment will be described below. Regarding the waveform of welding current I in the present embodiment, in a pulse waveform for pulse welding duration Tp when shifting from pulse welding duration Tp to short-circuit welding duration Ts, value Ib6 of welding current I immediately before shifting to short-circuit welding duration Ts after pulses Pp1 to Pp5 are formed is controlled so as to be current value (A) which is smaller than at least one of one or more values Ib1 to Ib5 of base current Ib of pulses Pp1 to Pp5. In accordance with Embodiment 1, value Ib6 of welding current I immediately before short circuit occurs is controlled so as to be lower than value Ib5 of base current Ib of previous pulse Pp5. In accordance with Embodiment 1, value Ib6 of welding current I may be controlled so as to be a current value smaller than the average value of one or more values Ib1 to Ib5 of base current Ib of pulses Pp1 to Pp5. Otherwise, value Ib6 of welding current I may be controlled so as to be a current value smaller than one or more values Ib1 to Ib5 of base current Ib of pulses Pp1 to Pp5. For pulse welding duration Tp, when welding current I is lower than base current Ib of pulses Pp1 to Pp5 after pulses Pp1 to Pp5 are formed, welding shifts to short-circuit welding duration Ts. For short-circuit welding duration Ts when shifting from pulse welding duration Tp to short-circuit welding duration Ts, value Ib7 of welding current I after short circuit is detected for short-circuit duration Tss1 immediately after shifting is controlled so as to be current value (B) which is smaller than value Ib5 of base current Ib for pulse welding duration Tp before shifting and is smaller than value Ib6 of welding current I immediately before shifting from pulse welding duration Tp to short-circuit welding duration Ts. Controlling (B, C) of the rapid decrease of welding current I is performed at least at one of the times when short circuit is detected for short-circuit welding duration Ts and neck 15A of welding wire 15 is detected. Neck 15A is a locally narrow portion generated in welding wire 15 immediately before short circuit is released, as illustrated in FIG. 1B. Neck 15A narrowed in welding wire 15 reduces the cross-sectional area of welding wire 15 and increases the resistance value. The voltage rises in response to the generating of neck 15A. Neck 15A which is the locally narrow portion in welding wire 15 immediately before short circuit is released can be detected by monitoring voltage change dv/dt per unit time. An effect of above welding current I will be described.

In a consumable electrode-type arc welding method in which pulse welding and short-circuit welding are alternately performed repetitively a predetermined number of times, for the pulse welding duration and the short-circuit welding duration, there is a difference in, e.g. the sizes of droplets made of a molten welding wire, and the sizes of molten pools formed due to the droplets. Therefore, for example, when shifting from the pulse welding to the short-circuit welding, short circuit occurs while a large heat is put to the droplets. Accordingly, the short circuit tends to be slight short circuit in which short circuit is released immediately after the short circuit occurs, thus generating sputter. When slight short circuit occurs, the period of short circuit becomes unstable, and welding is no longer stable. Meanwhile, when shifting from the short-circuit welding to the pulse welding, the peak current of a pulse is output while the molten pool is small and an arc does not expand. Accordingly, arc reaction force may be strong, causes formed droplets to be scattered due to the arc reaction force, and generates sputter having large granules.

In the arc welding in accordance with Embodiment 1, when shifting from pulse welding duration Tp to short-circuit welding duration Ts for pulse welding duration Tp, welding current I is controlled immediately before shifting as to be current value (A) which is smaller than base current Ib of pulses Pp1 to Pp5 and facilitates short circuit immediately after the shifting for short-circuit welding duration Ts, and allows short circuit between welding wire 15 and welding workpiece 18 to occur while preventing a droplet made of molten welding wire 15 from growing. This configuration prevents sputter from being generated at the time of short circuit. Moreover, welding current I immediately before the shifting continuously have, for a predetermined duration, current value (A) smaller than base current Ib of pulses Pp1 to Pp5 which are continuously and repetitively generated. This configuration prevents an undershoot when welding current I is reduced from value Ip6 of peak current Ip of pulse Pp6, thus stabilizing welding.

When shifting from pulse welding duration Tp to short-circuit welding duration Ts for short-circuit welding duration Ts, welding current I after short circuit is detected for short-circuit duration Tss1 immediately after shifting is controlled as to be current value (B) which is smaller than base current Ib of pulse Pp6 for pulse welding duration Tp before the shifting and is smaller than current (A) of welding current I. This operation reliably provides a short circuit between welding wire 15 and welding workpiece 18, and prevents slight short circuit in which short circuit is released immediately after the short circuit occurs from occurring, thus preventing sputter from being generated.

When controlling (B, C) of rapid decrease of welding current I is performed at least at one of the time when short circuit is detected for short-circuit welding duration Ts and the time when neck 15A is detected for short-circuit welding duration Ts, current I at the time of short circuit and at the time of releasing short circuit can be reduced. Sputter at the time of short circuit and the time of releasing short circuit can be accordingly prevented from being generated.

When welding current I is controlled as described above, even though pulse welding of high heat input and short-circuit welding of low heat input are alternately repeated at a short period, sputter can hardly be generated while shifting between welding durations Tp and Ts. Thus, it is possible to realize a welding method having advantages of both the welding methods. The heat input can be easily controlled by appropriately combining the number of pulses Pp1 to Pp6 and the number of short-circuit durations Tss1 to Tss3. Accordingly, the shape of bead 18A can be improved, and thus, a position welding can be easily performed.

As described above, welding apparatus 50 is controlled such that value Ib6 of welding current I after pulses Pp1 to Pp6 are formed for pulse welding duration Tp and immediately before shifting from pulse welding duration Tp to short-circuit welding duration Ts becomes smaller than at least one of one or more values Ib1 to Ib5 of base current Ib of pulses Pp1 to Pp5.

Welding apparatus 50 may be controlled such that value Ib6 of welding current I for pulse welding duration Tp becomes smaller than the average value of one or more values of Ib1 to Ib5 of base current Ib in plurality of pulses Pp1 to Pp5.

Welding apparatus 50 may be controlled such that value Ib6 of welding current I for pulse welding duration Tp becomes smaller than one or more values Ib1 to Ib5 of base current Ib of pulses Pp1 to Pp5.

Short circuit between the welding electrode (welding wire 15) and welding workpiece 18 is detected for short-circuit welding duration Ts. Welding apparatus 50 may be controlled such that value Ib7 of welding current I after detecting of short circuit becomes smaller than one or more values Ib1 to Ib5 of base current Ib and smaller than value Ib6 of welding current I for short-circuit welding duration Ts.

Neck 15A of welding wire 15 may be detected for short-circuit welding duration Ts. Welding apparatus 50 may be controlled such that welding current I drops at least at one of the time when short circuit is detected for short-circuit welding duration Ts and the time when neck 15A is detected for short-circuit welding duration Ts.

As described above in detail, in order to control heat input and to control the shape of bead 18A, pulse welding and short-circuit welding are alternately performed repetitively a predetermined number of times. Since pulse welding of large heat input and short-circuit welding of small heat input are alternately performed repetitively in a short time, it is possible to realize a welding method having advantages of both the welding methods. The heat input can be easily controlled by appropriately combining the number of times of short-circuit welding and the number of times of pulse welding. Accordingly, the shape of bead 18A can be improved, and thus, a position welding can be easily performed.

Exemplary Embodiment 2

Figure 3:
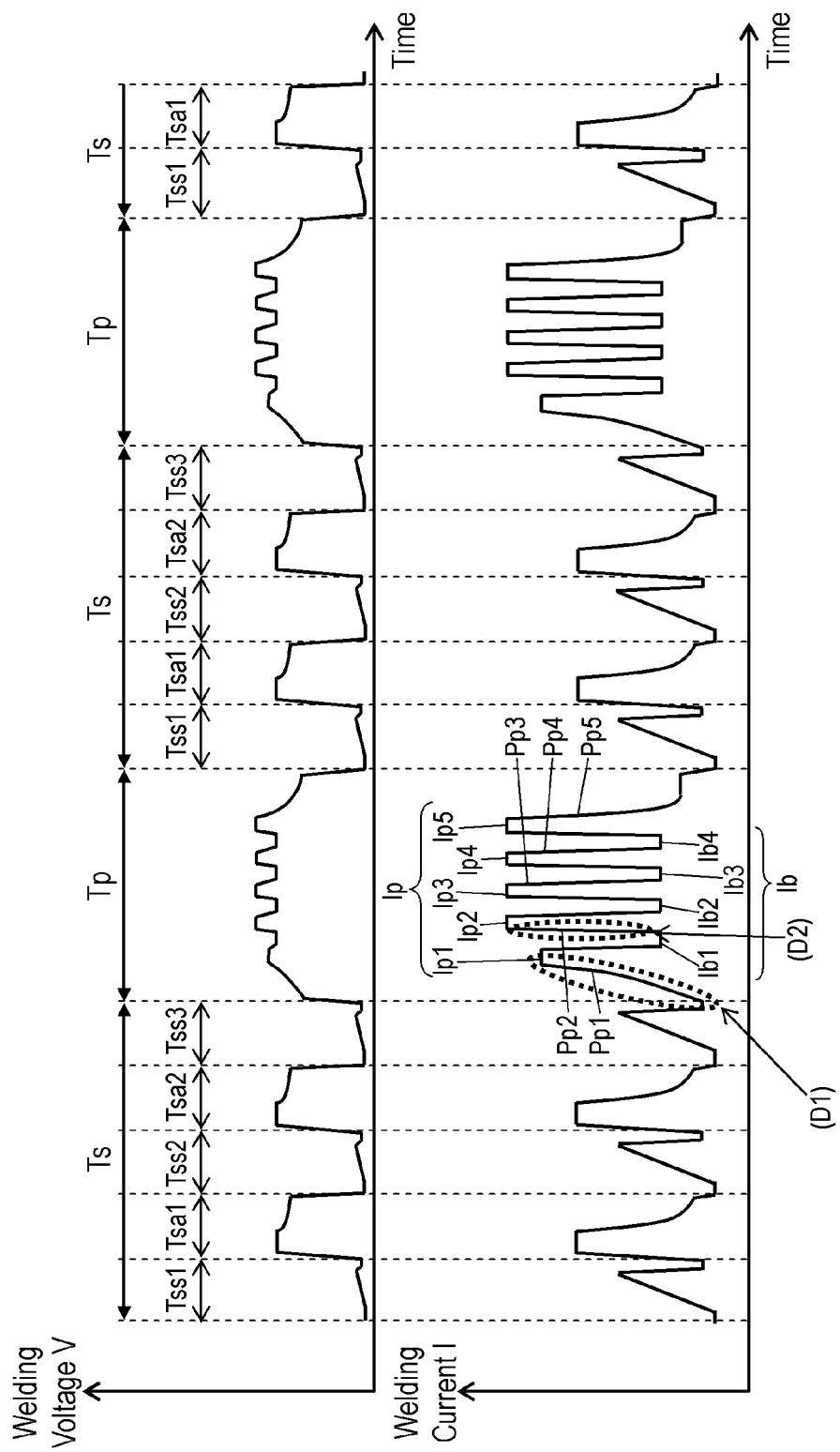
FIG. 3 illustrates a welding current and a welding voltage of arc welding in accordance with Exemplary Embodiment 2.

FIG. 3 illustrates a welding current and a welding voltage of an arc welding in accordance with Exemplary Embodiment 2. In FIG. 3, items identical to those illustrated in FIG. 2 are denoted by the same reference numerals. In accordance with Embodiment 2, differently from Embodiment 1, in pulses Pp1 to Pp5 which are continuously generated for pulse welding duration Tp when shifting from short-circuit welding duration Ts to pulse welding duration Tp, inclination (D1) of the welding current reaches value Ip1 of peak current Ip of pulse Pp1 firstly appearing after the shifting is different from inclinations (D2) of the current of pulses Pp2 to Pp5 appearing secondly and subsequently thereto. The difference is caused based on the difference between the sizes of molten pools 15P for short-circuit welding duration Ts and pulse welding duration Tp. Since heat input is smaller for short-circuit welding duration Ts than that for pulse welding duration Tp, molten pool 15P is smaller than that for pulse welding duration Tp. Therefore, when shifting from short-circuit welding duration Ts to pulse welding duration Tp, value Ip1 of significant peak current Ip of pulse Pp1 firstly appearing for pulse welding duration Tp is instantaneously applied to small molten pool 15P formed for short-circuit welding duration Ts. For the duration, arc 17 does not expand due to small molten pool 15P, and arc reaction force is strong. Therefore, droplets formed due to the arc reaction force may be scattered, and sputter having large granules may be generated. In accordance with Embodiment 2, as illustrated in FIG. 3, in pulses Pp1 to Pp5 which are continuously generated for pulse welding duration Tp when shifting from short-circuit welding duration Ts to pulse welding duration Tp, inclination (D1) of the welding current reaching value Ip1 of peak current Ip of pulse Pp1 firstly appearing after the shifting is different from inclination (D2) of the welding current reaching values Ip2 to Ip5 of peak current Ip of pulses Pp2 to Pp5 appearing secondly and subsequently thereto. Accordingly, the arc reaction force can be prevented from instantaneously increasing, and sputter having large granules can be prevented from being generated.

As described above, welding current I is controlled such that an inclination of the welding current to value Ip1 of peak current Ip of pulse Pp1 out of pulses Pp1 to Pp5 which appears firstly among pluses Pp1 to Pp5 is different from inclinations of the wending current to values Ip2 to Ip5 of peak current Ip of pulses Pp2 to Pp5 out of pulses Pp1 to Pp5 which are different from pulse Pp1 which appears firstly among pluses Pp1 to Pp5.

Figure 4:
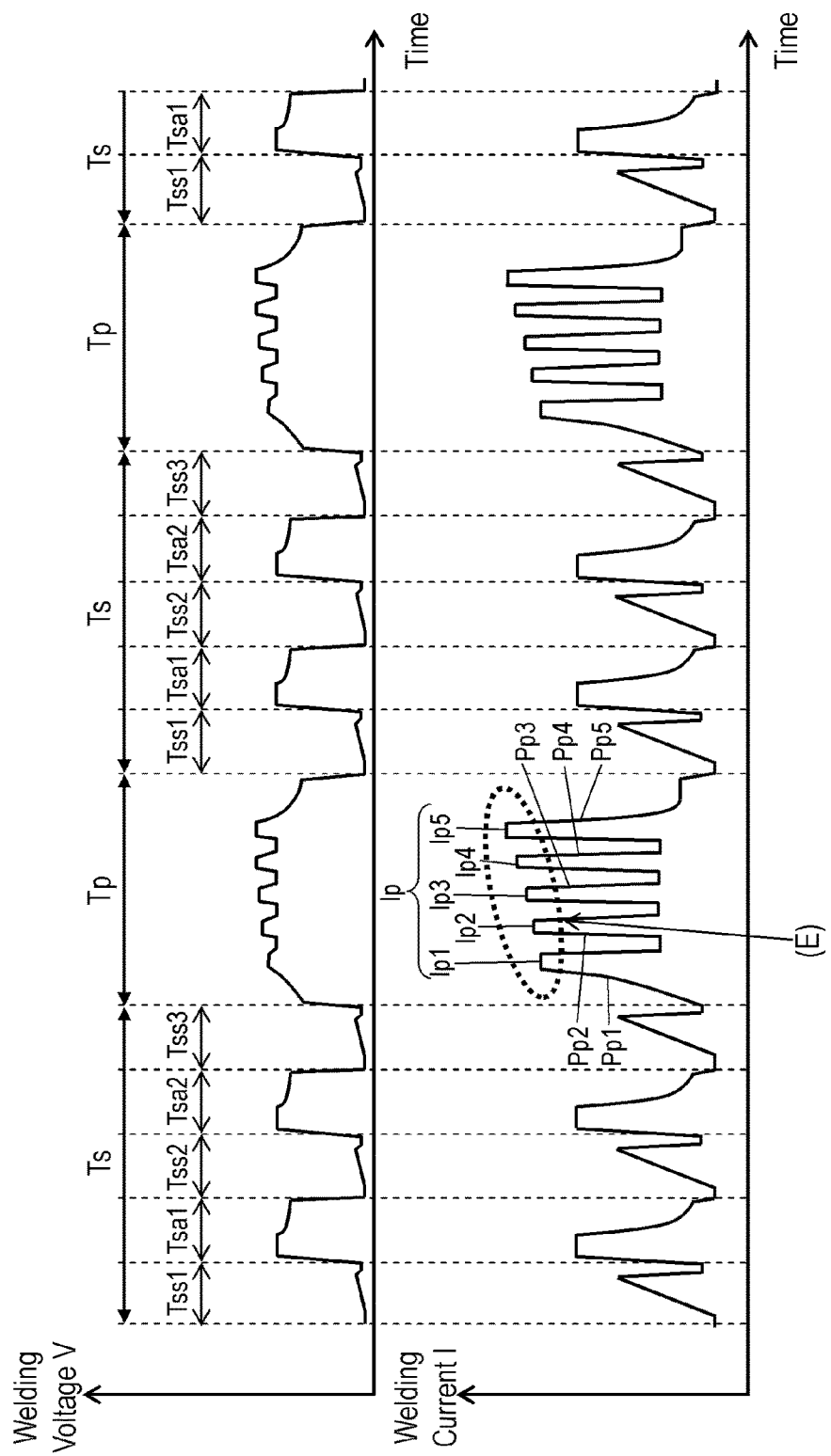
FIG. 4 illustrates a welding current and a welding voltage of another arc welding in accordance with Embodiment 2.

FIG. 4 illustrates welding current I and welding voltage V for another arc welding in accordance with Embodiment 2. In FIG. 4, items identical to those illustrated in FIG. 3 are denoted by the same reference numerals. In the arc welding illustrated in FIG. 4, in pulses Pp1 to Pp5 for pulse welding duration Tp, at least one parameter group out of the parameter groups (1) to (3): (1) the inclination of the welding current reaching values Ip1 to Ip5 of peak current Ip, (2) the inclination returning to base current Ib from values Ip1 to Ip5 of peak current Ip, and (3) values Ip1 to Ip5 of peak current Ip, change gradually and monotonically (continuously) with respect to time (E). The term "monotonically" means that the parameter group continuously increases or decreases with respect to time regardless of whether or not the rate of the change is constant or changes. This controlling changes the waveform of welding current I continuously in accordance with the size of molten pool 15P. Here, the expressions such as "change continuously" and "changed gradually and monotonically" means that at least two portions changing gradually and monotonically are included in pulses Pp1 to Pp5 which are continuously generated plural times. Any of the methods shown in FIGS. 3 and 4 may be used as long as preventing sputter having large granules from being generated.

As described above, inclinations to values Ip1 to Ip5 of peak current Ip of pulses Pp1 to Pp5 monotonically change. Inclinations of the welding current returning to base current Ib from values Ip1 to Ip5 of peak current Ip of pulses Pp1 to Pp5 may monotonically change. Values Ip1 to Ip5 of peak current Ip may change monotonically.

Exemplary Embodiment 3

Figure 5:
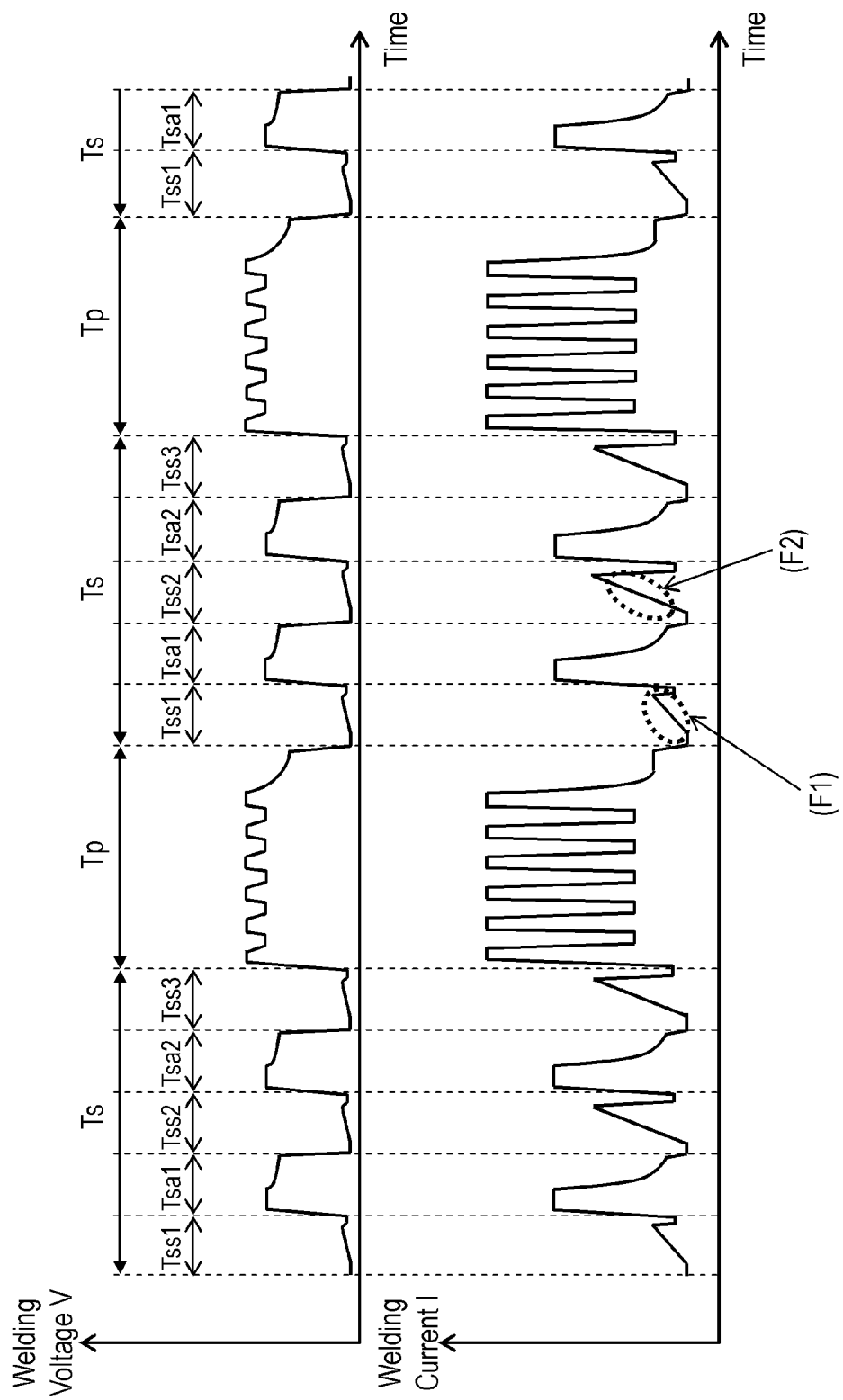
FIG. 5 illustrates a welding current and a welding voltage of arc welding in accordance with Exemplary Embodiment 3.

FIG. 5 illustrates welding current I and welding voltage V in an arc welding in accordance with Exemplary Embodiment 3. In FIG. 5, items identical to those illustrated in FIG. 2 are denoted by the same reference numerals. In the arc welding according to Embodiment 3 illustrated in FIG. 5, differently from Embodiment 1, in short-circuit durations Tss1 to Tss3 which are continuously generated for short-circuit welding duration Ts when shifting from pulse welding duration Tp to short-circuit welding duration Ts, arc welding is controlled such that inclination (F1) of an increase of welding current I for short-circuit duration Tss1 firstly appearing after the shifting is different from inclination (F2) of an increase of welding current I for short-circuit durations Tss2 and Tss3 which appear secondly and subsequently thereto. The controlling is performed since the heat input added to droplets is different between pulse welding duration Tp and short-circuit durations Tss1 to Tss3. When shifting from pulse welding duration Tp to short-circuit welding duration Ts, since heat input added to droplets is large, slight short circuit in which short circuit is released immediately after the short circuit occurs may occur. An inclination of an increase of welding current I for short-circuit duration Tss1 firstly appearing after the shifting is smaller than the inclination of an increase of welding current I for short-circuit durations Tss2 and Tss3 which appear secondly and subsequently thereto. This configuration prevents slight short circuit from occurring by preventing heat input from being applied to welding wire 15 for short-circuit duration Tss1. This configuration prevents slight short circuit from occurring and prevents sputter from being generated.

As described above, welding current I is controlled such that the inclination of an increase of welding current I for short-circuit duration Tss1 firstly appearing among short-circuit durations Tss1 to Tss3 is different from the inclination of an increase of welding current I for short-circuit durations Tss2 and Tss3 out of short-circuit durations Tss1 to Tss3 other than short-circuit duration Tss1.

Figure 6:
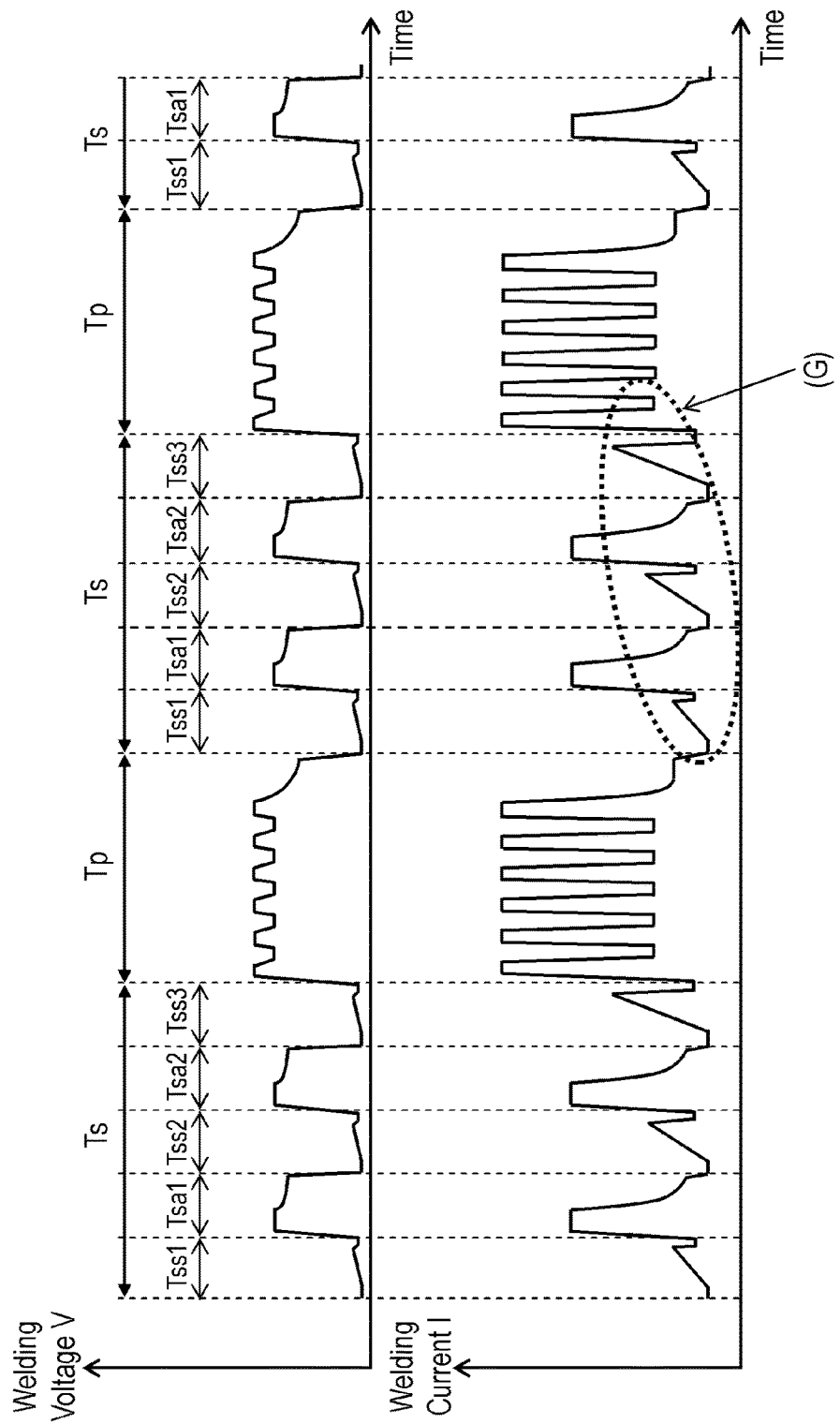
FIG. 6 illustrates a welding current and a welding voltage of another arc welding in accordance with Embodiment 3.

FIG. 6 illustrates welding current I and welding voltage V in another arc welding according to Embodiment 3. In FIG. 6, items identical to those illustrated in FIG. 5 are denoted by the same reference numerals. In the arc welding illustrated in FIG. 6, the inclination of an increase of welding current I for short-circuit durations Tss1 to Tss3 changes gradually and monotonically (G). In accordance with heat input added to droplets made of molten welding wires 15, the inclination of an increase of welding current I for short-circuit durations Tss1 to Tss3 changes gradually and monotonically (continuously) (G). The methods shown in FIGS. 5 and 6 may be used as long as preventing slight short circuit from occurring.

As described above, welding current I is controlled such that the inclination of an increase of welding current I for short-circuit durations Tss1 to Tss3 changes monotonically.

Figure 7:
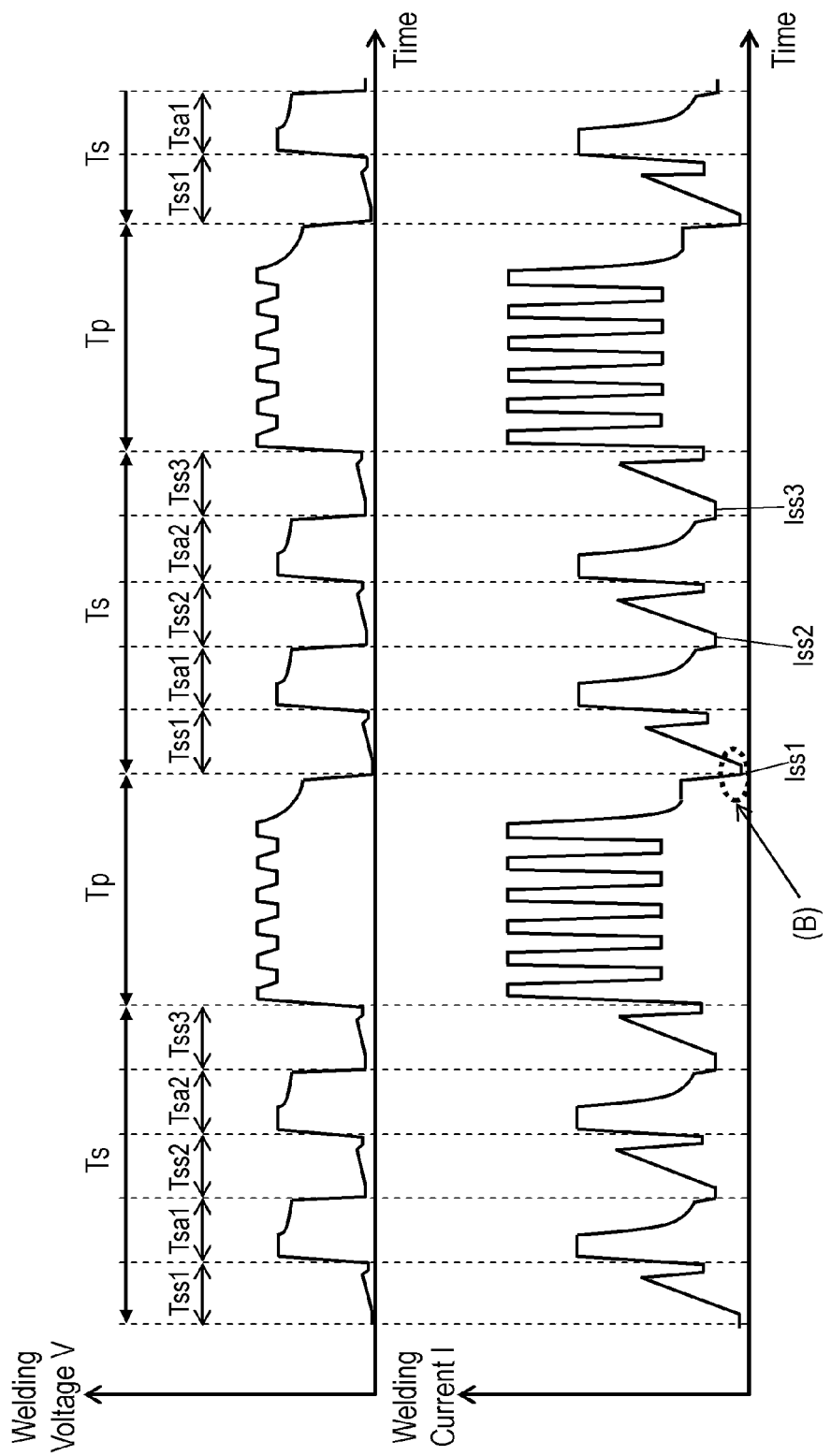
FIG. 7 illustrates a welding current and a welding voltage of still another arc welding in accordance with Embodiment 3.

FIG. 7 illustrates welding current I and welding voltage V in still another arc welding according to Embodiment 3. In FIG. 7, items identical to those illustrated in FIG. 5 are denoted bye the same reference numerals. In the arc welding illustrated in FIG. 7, for short-circuit durations Tss1 to Tss3 which continues for short-circuit welding duration Ts when shifting from pulse welding duration Tp to short-circuit welding duration Ts, arc welding is controlled such that a value of initial short-circuit current Iss1 (B) for short-circuit duration Tss1 appearing firstly after the shifting is different from the values of initial short-circuit currents Iss2 and Iss3 for short-circuit durations Tss2 and Tss3 which appear secondly and subsequently thereto. This configuration prevents heat input from being applied to welding wire 15 for short-circuit duration Tss1, and prevents minute short circuit from occurring.

As described above, welding current I is controlled such that the initial value (initial short-circuit current Iss1) of welding current I for short-circuit duration Tss1 which appears firstly among short-circuit durations Tss1 to Tss3 is different from the initial values (initial short-circuit currents Iss2 and Iss3) of welding current I for short-circuit durations Tss2 and Tss3 out of other than first short-circuit duration Tss1.

Figure 8:
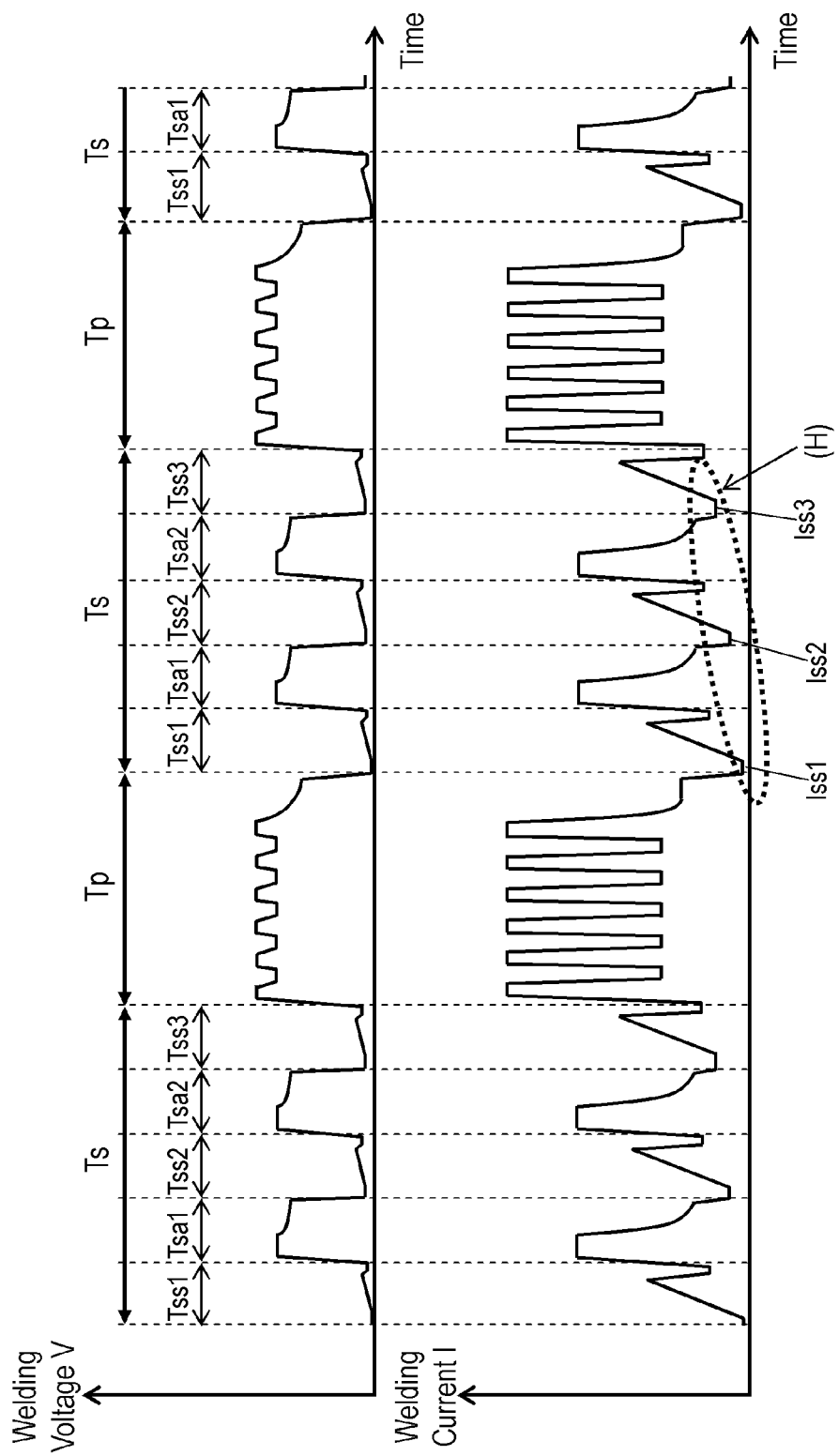
FIG. 8 illustrates a welding current and a welding voltage of a further arc welding in accordance with Embodiment 3.

FIG. 8 illustrates welding current I and welding voltage V for a further arc welding according to Embodiment 3. In FIG. 8, items identical to those illustrated in FIG. 7 are denoted by the same reference numerals. In the arc welding illustrated in FIG. 8, the values of initial short-circuit currents Iss1 to Iss3, that is, the initial values of welding current I for short-circuit durations Tss1 to Tss3 which continue for short-circuit welding duration Ts when shifting from pulse welding duration Tp to short-circuit welding duration Ts change gradually and monotonically (continuously) (H). Any of the methods in FIGS. 7 and 8 may be used as long as preventing slight short circuit from occurring. Here, the expressions such as "change continuously" and "changed gradually" means that at least a portion which changes gradually is included in welding current I continuously generated plural times.

As described above, welding current I is controlled such that the initial values (initial short-circuit currents Iss1 to Iss3) of welding current I for short-circuit durations Tss1 to Tss3 change monotonically.

Exemplary Embodiment 4

Figure 9:
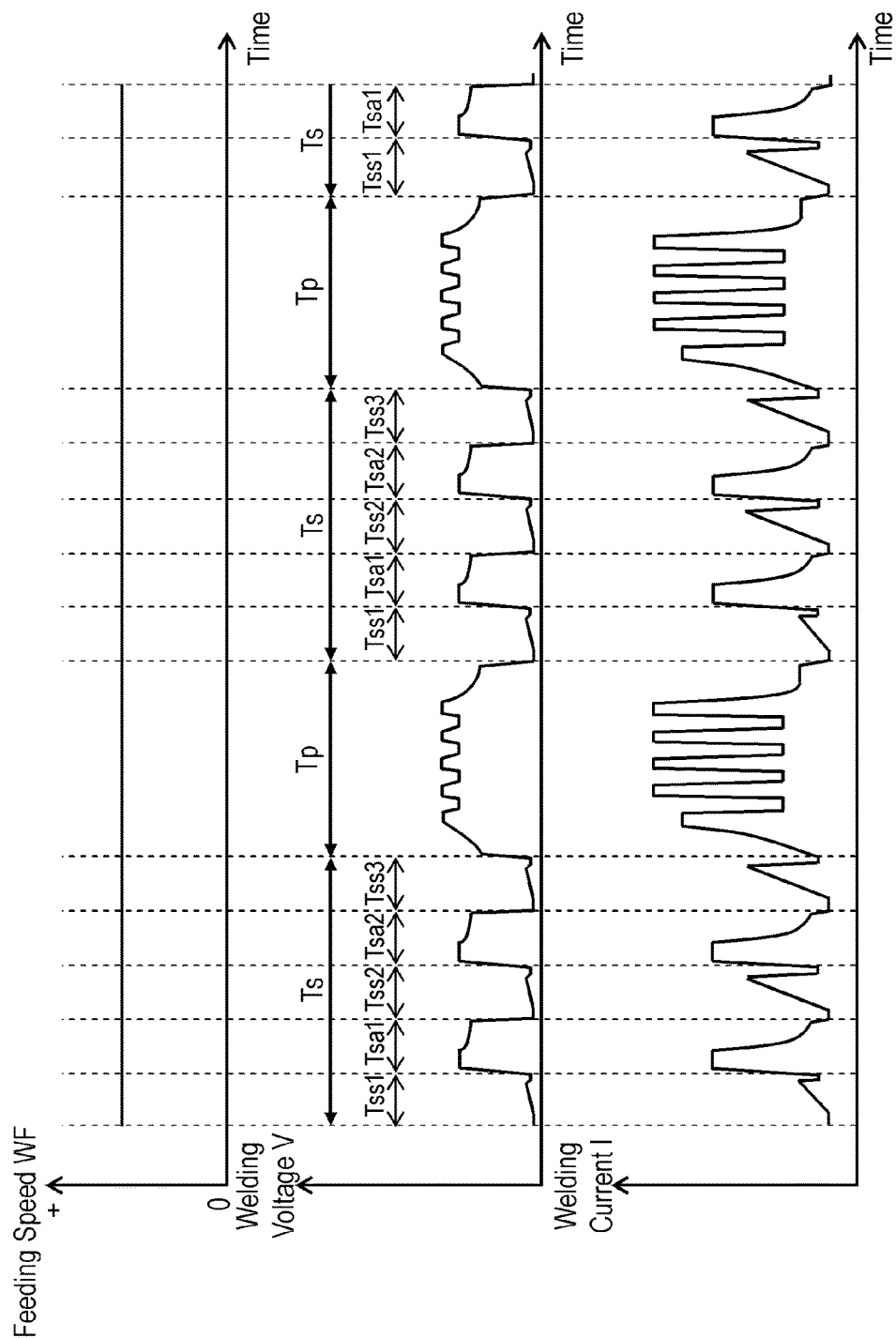
FIG. 9 illustrates a welding current, a welding voltage, and a wire feeding speed of arc welding in accordance with Exemplary Embodiment 4.

FIG. 9 illustrates welding current I, welding voltage V, and feeding speed WF of welding wire 15 (the amount of feeding welding wire 15, a welding electrode per unit time) in arc welding according to exemplary Embodiment 4. In FIG. 9, the vertical axes represent feeding speed WF, welding voltage V, and welding current I. The horizontal axes represent time. In FIG. 9, items identical to those illustrated in FIG. 3 are denoted by the same reference numerals. In accordance with Embodiment 4, the average feeding speed which is the average of feeding speed WF of welding wire 15 for pulse welding duration Tp is identical to the average feeding speed of welding wire 15 for short-circuit welding duration Ts. Particularly in the arc welding illustrated in FIG. 9, welding workpiece 18 is welded at constant feeding speed WF for welding durations Tp and Ts. Therefore, the amount of welding wire 15 welded to welding workpiece 18 can be constantly retained.

Figure 10:
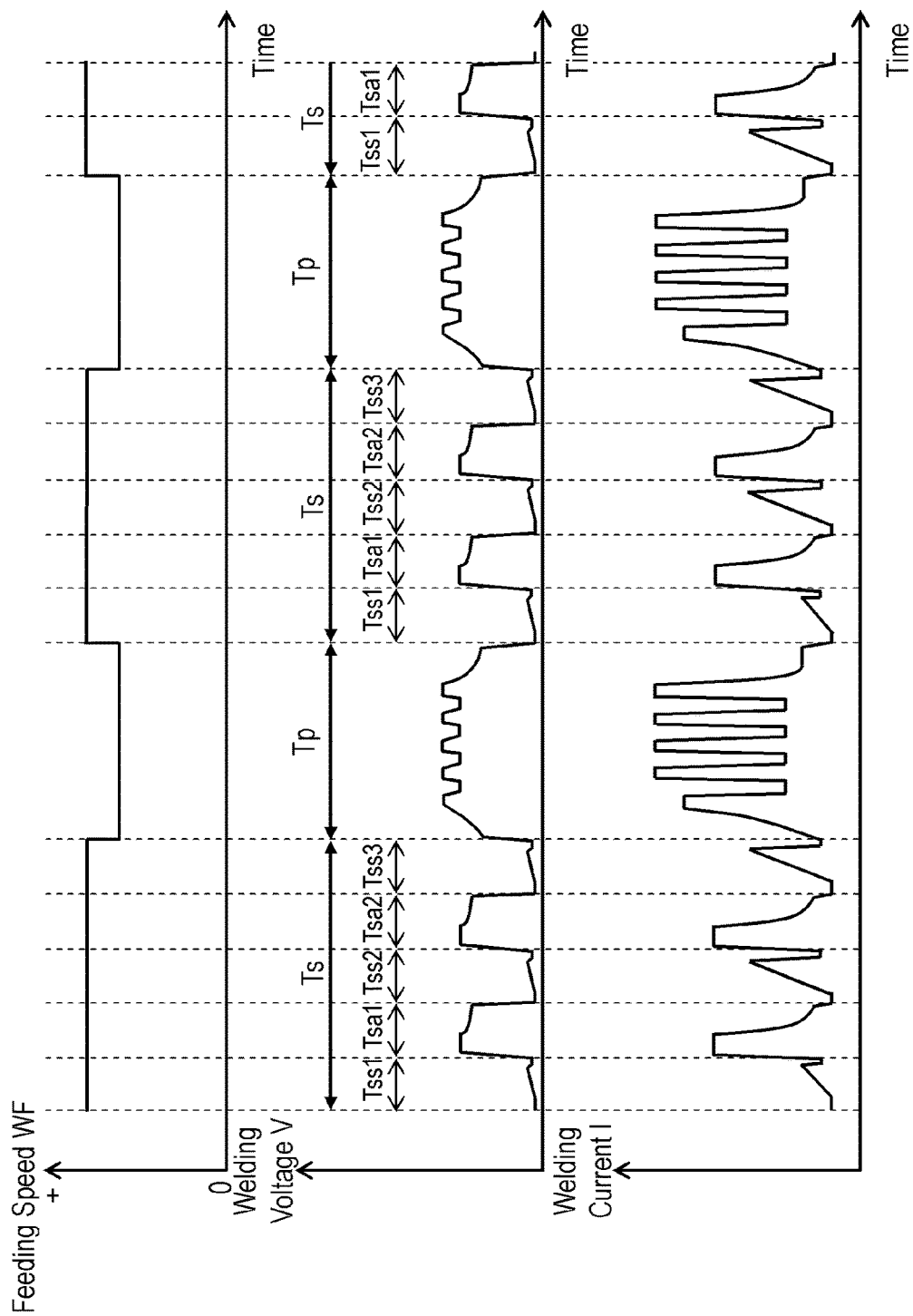
FIG. 10 illustrates a welding current, a welding voltage, and a wire feeding speed of another arc welding in accordance with Embodiment 4.

FIG. 10 illustrates welding current I, welding voltage V, and wire feeding speed WF (the amount of feeding welding wire 15, a welding electrode, per unit time) in another arc welding in accordance with Embodiment 4. In FIG. 10, items identical to those illustrated in FIG. 9 are denoted by the same reference numerals. In the arc welding illustrated in FIG. 10, the average feeding speed which is the average of feeding speed WF of welding wires 15 for pulse welding duration Tp is different from the average feeding speed of welding wire 15 for short-circuit welding duration Ts. The difference is caused due to the difference between the appearance of bead 18A for short-circuit welding duration Ts and the appearance of bead 18A for pulse welding duration Tp under the condition that welding wire 15 is fed at the same feeding speed for durations Ts and Tp. The appearance of bead 18A for short-circuit welding duration Ts has a smaller width and larger height than the appearance of bead 18A for pulse welding duration Tp since heat input is smaller for short-circuit welding duration Ts than for pulse welding duration Tp. As illustrated in FIG. 10, the widths of beads 18A can be aligned and can coincide with each other by causing the average feeding speed of welding wire 15 for short-circuit welding duration Ts to be larger than the average feeding speed of welding wire 15 for pulse welding duration Tp. The control in which that the average feeding speed of welding wire 15 for pulse welding duration Tp is identical to the average feeding speed of welding wire 15 for short-circuit welding duration Ts and the control in which the average feeding speed of welding wire 15 for pulse welding duration Tp is different from the average feeding speed of welding wire 15 for short-circuit welding duration Ts, may be distinguishably performed as described below. In other words, in the case that welding durations Tp and Ts are short (for example, equal to or less than 50 msec) to the extent that the difference in the appearance of bead 18A is unlikely to be found between pulse welding duration Tp and short-circuit welding duration Ts, the feeding speed of welding wire 15 for pulse welding duration Tp is preferably euql to the feeding speed of welding wire 15 for short-circuit welding duration Ts. In contrast, in the case that pulse welding duration Tp and short-circuit welding duration Ts are long (for example, equal to or longer than 1 sec), the difference in the appearance of bead 18A is likely to be found. Accordingly, in order to cause the appearances of beads 18A, particularly, the widths of beads 18A between pulse welding duration Tp and short-circuit welding duration Ts to coincide with each other, as illustrated in FIG. 10, feeding speed WF for pulse welding duration Tp may be different from feeding speed WF for short-circuit welding duration Ts. In feeding speed WF for the both durations, a region where sputter is likely to be generated, a region where sputter is unlikely to be generated, a region which is likely to melt down in accordance with welding workpiece 18, a region which is unlikely to melt down, and the like are present. Therefore, the average feeding speed may be appropriately and distinguishably used depending on the case.

As described above, for pulse welding duration Tp, arc welding apparatus 50 is controlled such that welding current I flowing in welding wire 15 forms pulses Pp1 to Pp5 in which peak current Ip and base current Ib are alternately repeated as to form bead 18A in welding workpiece 18 by feeding welding wire 15 which is a welding electrode. Moreover, for short-circuit welding duration Ts, arc welding apparatus 50 is controlled to shift alternately between a short circuit welding in which short circuit between welding wire 15 and welding workpiece 18 for one or more short-circuit durations Tss1 to Tss3 and an pulse welding in which arc 17 is generated between welding wire 15 and welding workpiece 18 for one or more arc-generating durations Tsa1 and Tsa2, so as to form bead 18A in welding workpiece 18 by feeding welding wire 15. Welding wire 15 is fed such that the average feeding speed of welding wire 15 for pulse welding duration Tp is different from the average feeding speed of welding wire 15 for short-circuit welding duration Ts so as to cause the width of bead 18A for pulse welding duration Tp to coincide with the width of bead 18A for short-circuit welding duration Ts. Welding wire 15 is fed such that the average feeding speed of welding wire 15 for pulse welding duration Tp is different from the average feeding speed of welding wire 15 for short-circuit welding duration Ts, so as to cause the width of bead 18A for pulse welding duration Tp to coincide with the width of bead 18A for short-circuit welding duration Ts.

Exemplary Embodiment 5

Figure 11:
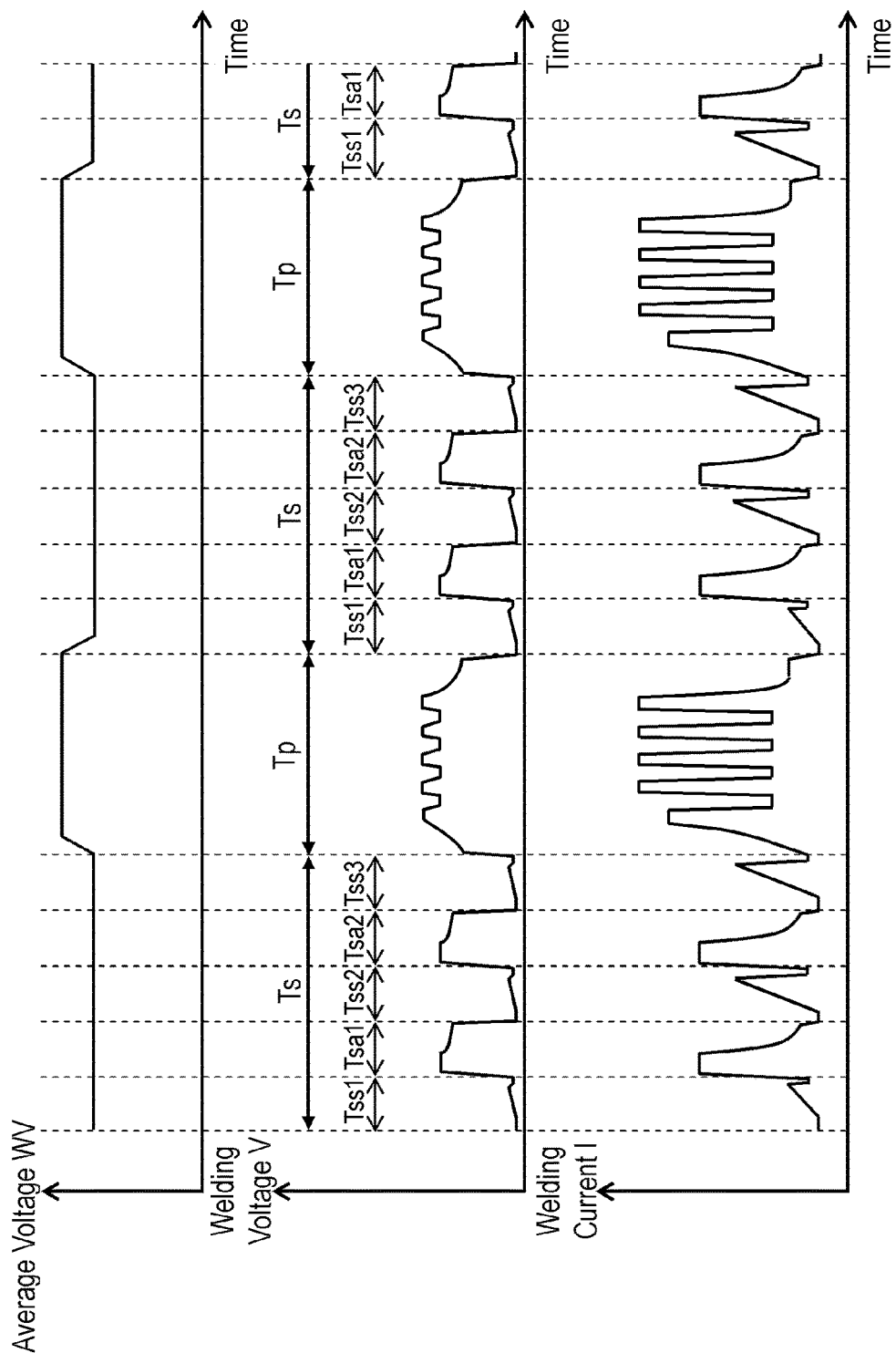
FIG. 11 illustrates a welding current, a welding voltage, and an average voltage of arc welding in accordance with Exemplary Embodiment 5.

FIG. 11 illustrates welding current I, welding voltage V, and average voltage WV (an average welding voltage V) in arc welding according to Exemplary Embodiment 5. In FIG. 11, the vertical axes represents average voltage WV, welding voltage V, and welding current I. The horizontal axes represent time. In FIG. 11, items identical to those illustrated in FIG. 3 are denoted by the same reference numerals. In the arc welding illustrated in FIG. 11, a constant-voltage control is performed for pulse welding duration Tp and short-circuit welding duration Ts so as to allow welding voltage V to be close to a setting voltage previously set. The constant-voltage control can be performed for pulse welding duration Tp by changing of the period of pulses Pp1 to Pp5 with respect to time, by changing the width of pulses Pp1 to Pp5 with respect to time, or by changing values Ip1 to Ip5 of peak current Ip or the value of base current Ib in accordance with time. The constant-voltage control can be performed for short-circuit durations Tss1 to Tss3 by changing the inclination of welding current I with respect to time, or by changing the peak current of welding current I with respect to time for arc-generating durations Tsa1 and Tsa2 after short circuit is released. The above method allows welding voltage V to be constantly more stably than the method the same waveform is alternately repeated, hence easily control the heat input.

Exemplary Embodiment 6

Figure 12:
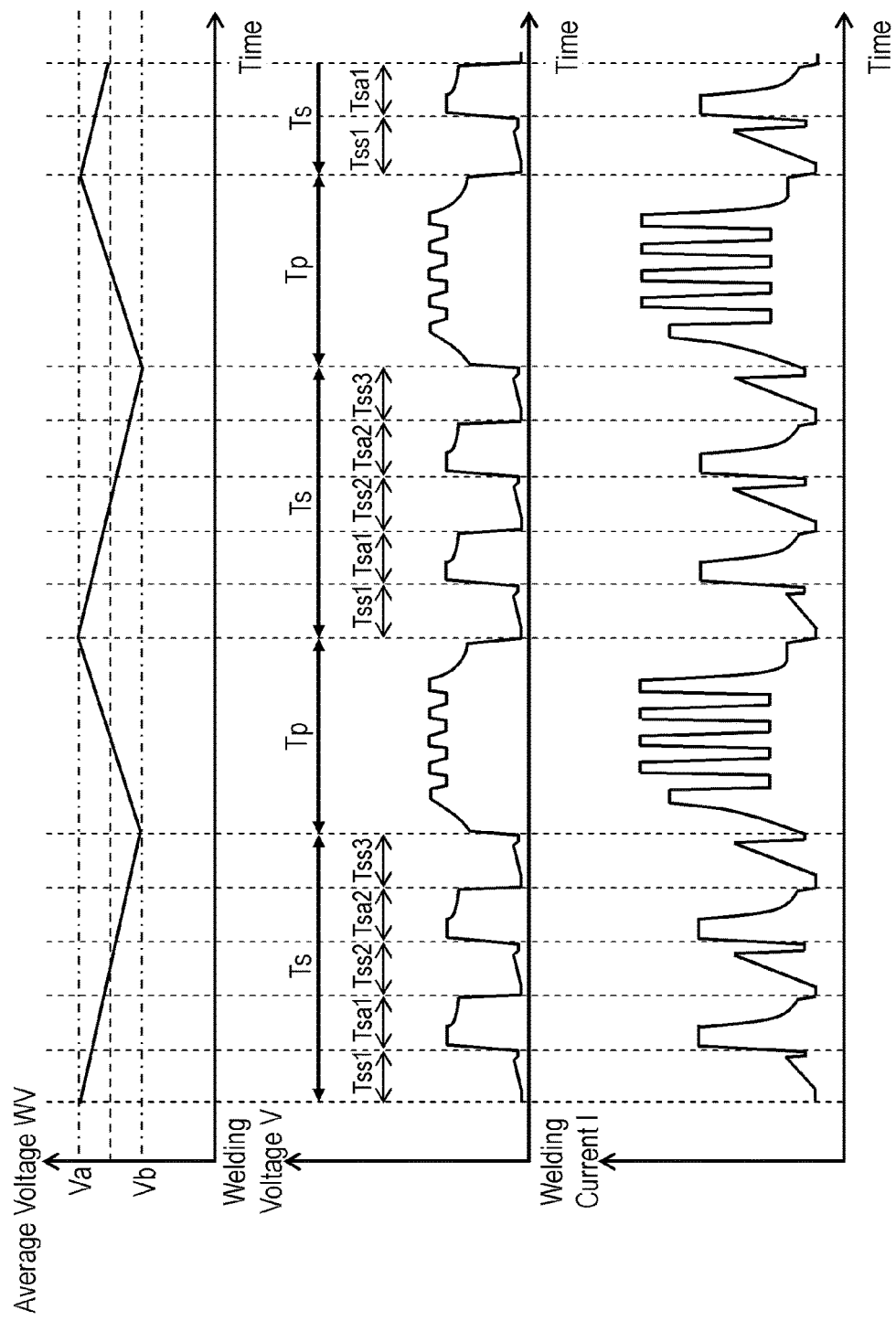
FIG. 12 illustrates a welding current, a welding voltage, and an average voltage of arc welding in accordance with Exemplary Embodiment 6.

FIG. 12 illustrates welding current I, welding voltage V, and the average voltage (the average of welding voltages V) in arc welding according to Exemplary Embodiment 6. In FIG. 12, the vertical axes represent average voltage WV, welding voltage V, and welding current I. The horizontal axes represent time. In FIG. 12, items identical to those illustrated in FIG. 11 are denoted by the same reference numerals. In the arc welding illustrated in FIG. 12, switching between the pulse welding and the short-circuit welding is determined through the constant-voltage control. This control prevents melting down of the workpiece. Upper limit Va and lower limit Vb of average voltage WV which is a moving average of welding voltages V for a predetermined duration are previously determined. For example, it is determined whether or not average voltage WV measured during welding reaches predetermined upper limit Va or predetermined lower limit Vb. Specifically, for pulse welding duration Tp, when average voltage WV reaches a value equal to or higher than upper limit Va, the welding is switched from the pulse welding to the short-circuit welding. For short-circuit welding duration Ts, when average voltage WV reaches a value equal to or lower than lower limit Vb, the welding is switched from the short-circuit welding to the pulse welding. The heat input to welding workpiece 18 is expressed as the product of welding current I and welding voltage V. Therefore, in the case that welding is performed by alternately repeating the pulse welding and the short-circuit welding in the waveform of welding current I previously determined, for example, even though the waveforms of welding current I are identical to each other, the waveforms of welding voltages V are not necessarily identical to each other. When the short-circuit welding continues, average voltage WV becomes close to average voltage WV in short-circuit welding providing a heat input. In addition, when the pulse welding continues, average voltage WV may rise. When average voltage WV rises, heat input increases and welding workpiece 18 is likely to melt down. Therefore, when the above-described controlling is applied by alternately repeating the pulse welding and the short-circuit welding, welding voltage V can be confined within a constant range any time, and heat input can be prevented from being excessively applied to welding workpiece 18, a base material.

As described above, when average voltage WV of welding wire 15 (a welding electrode) reaches predetermined upper limit Va for pulse welding duration Tp, the welding shifts from pulse welding duration Tp to short-circuit welding duration Ts. When average voltage WV of welding wire 15 reaches predetermined lower limit Vb for short-circuit welding duration Ts, the welding shifts from short-circuit welding duration Ts to pulse welding duration Tp.

Exemplary Embodiment 7

Figure 13:
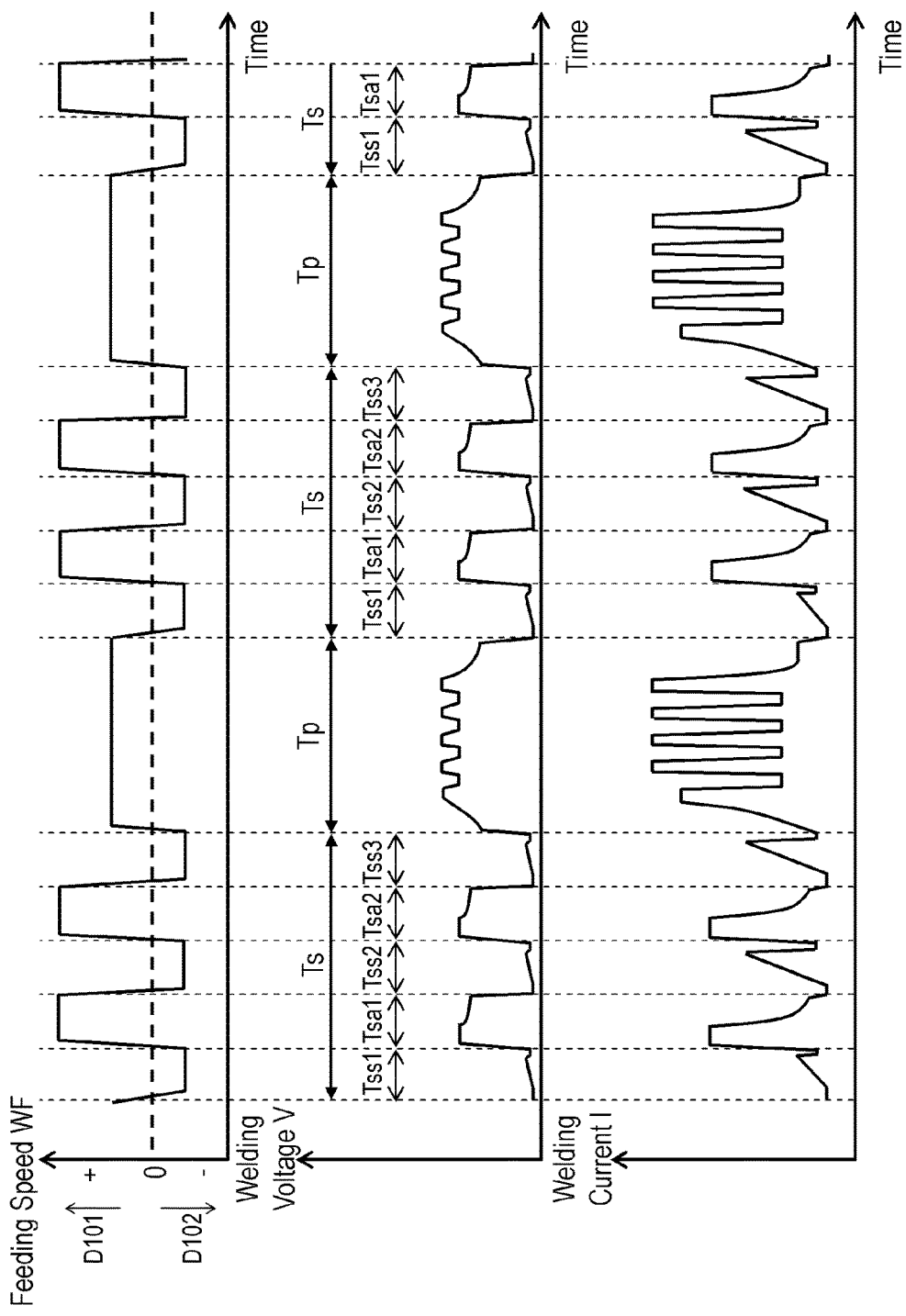
FIG. 13 illustrates a welding current, a welding voltage, and a feeding speed of a welding wire of arc welding in accordance with Exemplary Embodiment 7.
Figure 14:
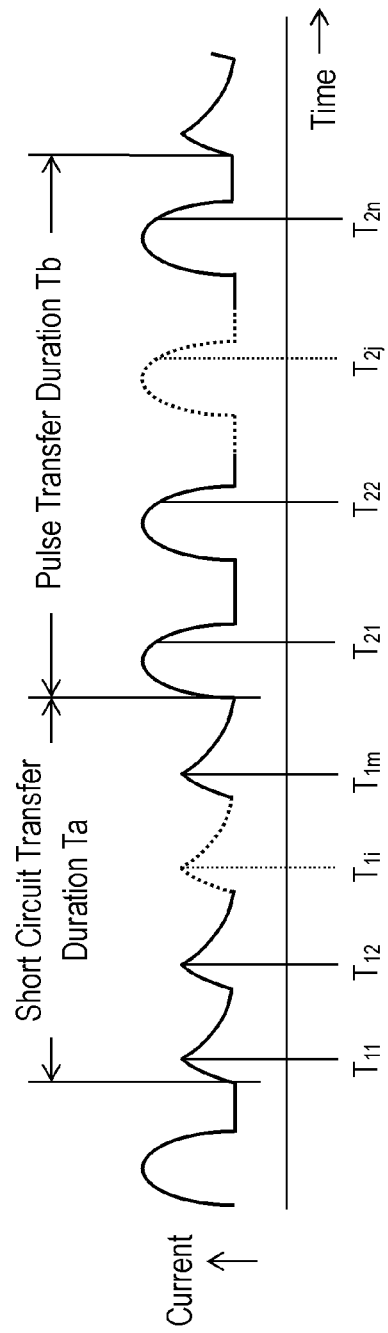
FIG. 14 illustrates a welding current of conventional arc welding.

FIG. 13 illustrates welding current I, welding voltage V, and a wire feeding speed of welding wire 15 in arc welding according to Exemplary Embodiment 7. In FIG. 13, the vertical axes represent feeding speed WF, welding voltage V, and welding current I. The horizontal axes represent time. In FIG. 13, items identical to those illustrated in FIG. 9 are denoted by the same reference numerals. In the arc welding illustrated in FIG. 13, for short-circuit welding duration Ts, based on detection of an arc and a short circuit between welding wire 15 and welding workpiece 18, welding wire 15 is fed in forward feeding direction D101 or backward feeding direction D102. When short circuit is detected for short-circuit welding duration Ts, welding wire 15 is fed in backward feeding direction D102 which is opposite to forward feeding direction D101 and which is away from welding workpiece 18. Moreover, when a release (an arc) of a short-circuit is detected for short-circuit welding duration Ts, welding wire 15 is fed in forward feeding direction D101. In this control, a forward feeding and a reverse feeding of welding wire 15 are mechanically performed in response to the short circuit and the release of the short-circuit. This feeding reduces the current when short circuit is released, hence reducing sputter generated when short circuit is released.

In the arc welding according to Embodiments 1 to 7 illustrated in FIGS. 1A to 13, when the short circuit between welding wire 15 (a welding electrode) and welding workpiece 18 occurs, welding wire 15 may be fed in forward feeding direction D101 while decelerating the welding wire, and alternately, welding wire 15 may be fed in backward feeding direction D102 opposite to forward feeding direction D101. Moreover, when short circuit between welding wire 15 and welding workpiece 18 is released, welding wire 15 may be fed in forward feeding direction D101 while accelerating the welding wire.

INDUSTRIAL APPLICABILITY

A method of controlling arc welding according to the present invention can prevent sputter from being generated, perform welding at a stable period, and control heat input and the appearance of a bead without fail, thus being useful for a consumable electrode-type arc welding apparatus.

REFERENCE MARKS IN THE DRAWINGS 1 input power supply
2 primary rectifier
3 switch
4 transformer
5 secondary rectifier
6 dcl (inductance)
7 welding voltage detector
8 welding current detector
9 counter
10 control switch
11 current controller
12 current controller
13 driver
14 wire feeder
15 welding wire (welding electrode)
15A neck
16 welding torch
17 welding arc
18 welding workpiece
18A bead (first bead, second bead)
19 welding power supply
20 setting adjuster
D101 forward feeding direction
D102 backward feeding direction
Ib base current
Ip peak current
Pp1 to Pp6 pulse
Tp pulse welding duration
Ts short-circuit welding duration
Tss1 to Tss3 short-circuit duration
Tsa1, Tsa2 arc-generating duration

The invention claimed is:

1. A method of controlling a consumable electrode-type arc welding which alternately and repetitively shifts between a pulse welding duration in which a pulse welding is performed and a short-circuit welding duration in which a short-circuit welding is performed, the arc welding being executed by an arc welding apparatus including a welding electrode, the method comprising:

controlling the welding apparatus for the pulse welding duration such that a welding current flowing in the welding electrode forms a plurality of pulses alternately repeating one or more values of a peak current and one or more values of a base current; and controlling the welding apparatus for the short-circuit welding duration, such that the short-circuit welding duration includes one or more short-circuit durations for each of which short circuit between the welding electrode and a welding workpiece is produced and further includes one or more arc-generating durations for each of which an arc is generated between the welding electrode and the welding workpiece, the one or more short-circuit durations and the one or more arc-generating durations alternately shift, wherein the controlling the welding apparatus for the pulse welding duration comprises controlling the welding apparatus such that a first value of the welding current after the plurality of pulses are formed for the pulse welding duration and immediately before shifting from the pulse welding duration to the short-circuit welding duration is smaller than at least one of the one or more values of the base current of the plurality of pulses.

2. The method of claim 1, wherein the controlling the welding apparatus for the pulse welding duration comprises controlling the welding apparatus such that the first value of the welding current is smaller than an average value of the one or more values of the base current of the plurality of pulses.

3. The method of claim 1, wherein the controlling the welding apparatus for the pulse welding duration comprises controlling the welding apparatus such that the first value of the welding current is smaller than the one or more values of the base current of the plurality of pulses.

4. The method of claim 1, further comprising
detecting a short circuit between the welding electrode and the welding workpiece for the short-circuit welding duration, and
wherein the controlling the welding apparatus for the short-circuit welding duration comprises controlling the welding apparatus for the short-circuit duration such that a second value of the welding current after the detecting the short circuit is smaller than the one or more values of the base current and smaller than the first value of the welding current.

5. The method of claim 1, further comprising:

feeding the welding electrode in a forward feeding direction toward the welding workpiece at a constant feeding speed for the pulse welding duration;

upon short-circuiting between the welding electrode and the welding workpiece occurs for the short-circuit welding duration, feeding the welding electrode in the forward feeding direction or feeding the welding electrode in a backward feeding direction opposite to the forward feeding direction while decelerating the welding electrode; and upon releasing a short circuit between the welding electrode and the welding workpiece for the short-circuit welding duration, feeding the welding electrode in the forward feeding direction while accelerating the welding electrode.

6. The method of claim 1, wherein the controlling the welding apparatus for the short-circuit welding duration comprises shifting to a short-circuit duration immediately before shifting from the short-circuit welding duration to the pulse welding duration.

7. A method of controlling a consumable electrode-type arc welding which alternately and repetitively shifts between a pulse welding duration in which a pulse welding is performed and a short-circuit welding duration in which a short-circuit welding is performed, the arc welding being executed by an arc welding apparatus including a welding electrode, the method comprising:

controlling the welding apparatus for the pulse welding duration such that a welding current flowing in the welding electrode forms a plurality of pulses alternately repeating a peak current and a base current;

controlling the welding apparatus for the short-circuit welding duration, such that the short-circuit welding duration includes one or more short-circuit durations for each of which short circuit between the welding electrode and a welding workpiece is produced and further includes one or more arc-generating durations for each of which an arc is generated between the welding electrode and the welding workpiece, the one or more short-circuit durations and the one or more arc-generating durations alternately shift; and detecting a short circuit between the welding electrode and the welding workpiece for the short-circuit welding duration, wherein the controlling the welding apparatus for the short-circuit welding duration comprises controlling the welding apparatus for the short-circuit welding duration such that the welding current after the detecting the short circuit is smaller than the base current.

8. The method of claim 7, further comprising detecting a neck of the welding electrode for the short-circuit welding duration, wherein the controlling the welding apparatus for the short-circuit welding duration further comprises controlling the welding apparatus for the short-circuit welding duration to decrease the welding current at least at a time when the short circuit is detected and a time when the neck is detected.

* * * * *